US012753884B2

(12) United States Patent
Lee et al.

(10) Patent No.: US 12,753,884 B2
(45) Date of Patent: Oct. 6, 2026

(54) POWER-SAVING LIQUEFIED-GAS-FUEL SHIP AND METHOD FOR PROCESSING BOIL-OFF GAS FOR LIQUEFIED-GAS-FUEL SHIP

(71) Applicant: Hanwha Ocean Co., Ltd., Geoje-Si (KR)

(72) Inventors: Joon Chae Lee, Seoul (KR); Dong Kyu Choi, Seongnam-si (KR); Jin Ho Choi, Incheon (KR)

(73) Assignee: Hanwha Ocean Co., Ltd., Geoje-Si (KR)

( * ) Notice: Subject to any disclaimer, the term of this patent is extended or adjusted under 35 U.S.C. 154(b) by 147 days.

(21) Appl. No.: 18/561,714

(22) PCT Filed: Dec. 24, 2021

(86) PCT No.: PCT/KR2021/019839

§ 371 (c)(1),
(2) Date: Nov. 16, 2023

(87) PCT Pub. No.: WO2022/244941

PCT Pub. Date: Nov. 24, 2022

(65) Prior Publication Data

US 2024/0230033 A1 Jul. 11, 2024

(30) Foreign Application Priority Data

May 18, 2021 (KR) ........................ 10-2021-0063968

(51) Int. Cl.
*F17C 9/04* (2006.01)
*B63B 17/00* (2006.01)
(Continued)

(52) U.S. Cl.
CPC ............ *F17C 9/04* (2013.01); *B63B 17/0036* (2013.01); *B63H 21/38* (2013.01);
(Continued)

(58) Field of Classification Search
CPC ........ F17C 9/02; F17C 9/04; F17C 2221/033; F17C 2223/0161; F17C 2225/0123;
(Continued)

(56) References Cited

U.S. PATENT DOCUMENTS

2020/0124346 A1 4/2020 Felbab

FOREIGN PATENT DOCUMENTS

JP 2020-517865 A 6/2020
KR 10-2018-0012607 A 2/2018
(Continued)

OTHER PUBLICATIONS

WO-2017104698-A1 English Translation (Year: 2017).*
(Continued)

*Primary Examiner* — Frantz F Jules
*Assistant Examiner* — Devon Moore
(74) *Attorney, Agent, or Firm* — Knobbe, Martens, Olson & Bear, LLP

(57) ABSTRACT

A power-saving type liquefied-gas-fuel ship includes: a liquefied gas storage tank storing liquefied gas; an engine using the liquefied gas stored in the liquefied gas storage tank or boil-off gas generated by spontaneous vaporization of the liquefied gas as fuel; a fuel feeder supplying the liquefied gas as fuel for the engine; a compressor compressing the boil-off gas to a pressure required for the engine; a heat exchanger cooling the remaining boil-off gas not supplied to the engine among the boil-off gas compressed by the compressor; a refrigerant circulation line in which the refrigerant supplied to the heat exchanger circulates; a refrigerant compressor compressing the refrigerant discharged from the heat exchanger after heat exchange in the heat exchanger; and a cold heat recovery device recovering cold heat of the liquefied gas supplied as fuel for the engine to cool the refrigerant compressed by the refrigerant compressor.

8 Claims, 2 Drawing Sheets

(51) Int. Cl.
*B63H 21/38* (2006.01)
*F02M 21/02* (2006.01)

(52) U.S. Cl.
CPC . *F02M 21/0227* (2013.01); *F17C 2205/0326* (2013.01); *F17C 2221/033* (2013.01); *F17C 2223/0153* (2013.01); *F17C 2227/0135* (2013.01); *F17C 2227/0157* (2013.01); *F17C 2227/0341* (2013.01); *F17C 2227/0365* (2013.01); *F17C 2250/0439* (2013.01); *F17C 2265/033* (2013.01); *F17C 2265/066* (2013.01); *F17C 2270/0105* (2013.01)

(58) Field of Classification Search
CPC ...... F17C 2227/0128; F17C 2227/0135; F17C 2227/0157; F17C 2227/03; F17C 2227/0302; F17C 2227/0325; F17C 2227/0327; F17C 2227/0337; F17C 2227/0341; F17C 2227/0358; F17C 2227/0365; F17C 2250/0439; F17C 2250/0631; F17C 2260/021; F17C 2260/03; F17C 2260/031; F17C 2260/04; F17C 2260/042; F17C 2260/044; F17C 2260/046; F17C 2265/03; F17C 2265/032; F17C 2265/033; F17C 2265/034; F17C 2265/05; F17C 2265/06; F17C 2265/066; F17C 2270/0105; B63B 17/0036; F25J 1/0072; F25J 1/0242; F25J 1/0249; F25J 1/0252; F25J 1/0254; F25J 2240/82
See application file for complete search history.

(56) References Cited

FOREIGN PATENT DOCUMENTS

| | | | | | |
|---|---|---|---|---|---|
| KR | 10-2019-0080360 | A | | 7/2019 | |
| KR | 10-2020-0012670 | A | | 2/2020 | |
| KR | 10-2087179 | B1 | | 3/2020 | |
| KR | 20210039930 | A | * | 4/2021 | ............. B63B 25/16 |
| KR | 102370609 | B1 | * | 3/2022 | ......... F02M 21/0209 |
| WO | WO-2017104698 | A1 | * | 6/2017 | ............. F02M 21/02 |
| WO | WO 2019/145643 | A1 | | 8/2019 | |

OTHER PUBLICATIONS

KR-102370609-B1 English Translation (Year: 2022).*
KR-20210039930-A English Translation (Year: 2021).*
Notice of Allowance received in Japanese patent application No. 2023-570309 dated Dec. 24, 2024.
European Search Report (EESR) received in European patent application No. 21940951.3 dated Apr. 7, 2025.
International Search Report dated Apr. 20, 2022 in International Application No. PCT/KR2021/019839.

* cited by examiner

POWER-SAVING LIQUEFIED-GAS-FUEL SHIP AND METHOD FOR PROCESSING BOIL-OFF GAS FOR LIQUEFIED-GAS-FUEL SHIP

TECHNICAL FIELD

The present invention relates to a power-saving liquefied gas-fueled ship that can reduce power consumption of a reliquefaction system in treatment of boil-off gas generated by spontaneous vaporization of liquefied gas in a ship using liquefied gas as fuel, and a method for processing boil-off gas for the liquefied gas-fueled ship.

BACKGROUND ART

With the increasing international interest on prevention of marine air pollution, there is increasing demand for liquefied natural gas (LNG) fueled ships (LFS) as green ships. LFS has been granted approval in principle (AIP) by national classification societies to meet demand for cleaner energy due to environmental regulations. Application of LFS is expanding not only to LNG carriers equipped with LNG storage tanks to carry LNG cargo, but also to general merchant ships, such as container ships, tankers, and the like.

Natural gas is relatively environmentally friendly since natural gas does not produce sulfide compounds and soot due to a low content of sulfur when burned. Among engines used in ships, dual fuel engines capable of using natural gas as fuel include an ME-GI (MAN Electronic Gas Injection) engine, an X-DF (eXtra long stroke Dual Fuel) engine, and a DF (DFDE (Dual Fuel Diesel Electric) engine, a DFDG (Dual Fuel Diesel Generator) engine, and the like.

The ME-GI engine is a two-stroke cycle engine that is generally used for propulsion. The ME-GI engine operates on the basis of a diesel cycle in which high-pressure natural gas at a pressure of about 300 bar is injected directly into a combustion chamber near the top dead center of a piston.

The X-DF engine is a two-stroke cycle engine that is generally used for propulsion. Like the ME-GI engine, the X-DF engine directly drives a propeller to propel the ship. In addition, the X-DF engine uses medium-pressure natural gas at a pressure of about 16 bar as fuel and operates on the basis of the Otto cycle.

The DF engine is a four-stroke cycle engine that is generally used for power generation. The DF engine also operates on the basis of the Otto cycle, in which low-pressure natural gas at a pressure of about 6.5 bar is injected into a combustion air inlet and compressed as the piston rises.

Natural gas contains methane as a main component and has been attracting attention as an eco-friendly fuel that emits little or no environmental pollutants during combustion. Liquefied natural gas (LNG) is obtained by liquefying natural gas through cooling to about −163° C. under normal pressure and is very suitable for long-distance transportation by sea since its volume is reduced to about $1/600^{th}$ that of natural gas in a gaseous state. Accordingly, natural gas is mainly stored and transported as liquefied natural gas, which is easy to store and transport.

Since natural gas is liquefied at a cryogenic temperature of −163° C. under normal pressure, LNG storage tanks are typically insulated to maintain LNG in a liquid state. However, even though the LNG storage tanks are insulated, such storage tanks are limited in ability to block external heat. Accordingly, since external heat is continuously transferred to the LNG storage tank, LNG stored in the LNG tank continues to evaporate naturally during transportation, causing generation of boil-off gas (BOG).

Continuous production of boil-off gas in the LNG storage tank increases the internal pressure of the LNG storage tank. If the internal pressure of the storage tank exceeds a predetermined safe pressure, this can cause an emergency situation, such as rupture of the storage tank. Accordingly, there is a need to discharge boil-off gas from the storage tank using a safety valve. However, boil-off gas is a kind of LNG loss and is an important issue for transportation efficiency and fuel efficiency of LNG. Therefore, various methods are employed to handle boil-off gas generated in the LNG storage tank.

Recently, a method of using boil-off gas at a fuel demand site, such as an engine of a ship, a method of reliquefying boil-off gas and returning the reliquefied boil-off gas to an LNG storage tank, and a method combining these two approaches have been developed and put into use.

DISCLOSURE

Technical Tasks

Methods of reliquefying boil-off gas include a method of reliquefying boil-off gas through heat exchange of the boil-off gas with a refrigerant in a cooling cycle using a separate refrigerant, a method of reliquefying boil-off gas using the boil-off gas as a refrigerant without a separate refrigerant, and the like.

As the method of reliquefying boil-off gas using the boil-off gas as a refrigerant without a separate refrigerant, the present applicant has invented a method of reliquefying some of boil-off gas by cooling the boil-off gas compressed using a compressor through heat exchange with boil-off gas not compressed by the compressor, followed by expanding the cooled boil-off gas by a J-T valve or the like, and such a system is referred to as a partial reliquefaction system (PRS).

As the method of reliquefying boil-off gas using the boil-off gas as a refrigerant without a separate refrigerant, improved PRS technology in which compressed boil-off gas is cooled through heat exchange with uncompressed boil-off gas and reliquefied through adiabatic expansion, has been developed and applied to ships.

In the case where there is a large amount of boil-off gas to be reliquefied, for example, when the amount of boil-off gas generated in a storage tank is large due to a large amount of liquefied gas in the storage tank, or when the ship is at anchor or operates at a low speed to allow an engine of the ship to use a small amount of boil-off gas, the PRS alone may not be able to satisfy a required amount of reliquefaction. Thus, the present applicant has invented technology capable of achieving reliquefaction of greater amounts of boil-off gas through improvement of the PRS.

As an improved technology of the PRS, a system that allows boil-off gas to be further cooled by a cooling cycle using the boil-off gas as a refrigerant is referred to as a methane refrigeration system (MRS).

A system employing a separate cooling cycle may include, for example, a process using an SMR cycle, a process using a $C_3$MR cycle, and a process using a single refrigerant.

The process using a $C_3$MR cycle (Propane-precooled Mixed Refrigerant Cycle) is a process in which natural gas is cooled using a single propane refrigerant and is then liquefied and subcooled using a mixed refrigerant; the process using an SMR cycle (Single Mixed Refrigerant Cycle) is a process of liquefying natural gas using a mixed refrigerant consisting of multiple components; and the process using a single refrigerant is a process of liquefying natural gas using a nitrogen refrigerant system (NRS).

Since both the SMR cycle and the $C_3$MR cycle use a mixed refrigerant and have a problem of deterioration in liquefaction efficiency when the composition of the mixed refrigerant is changed due to leakage of the refrigerant as the liquefaction process proceeds, it is necessary to maintain the composition of the refrigerant by continuously measuring the composition of the mixed refrigerant while adding a deficient refrigerant component.

On the other hand, although a cycle using nitrogen refrigerant has lower efficiency than a cycle using a mixed refrigerant, the nitrogen refrigerant has an advantage of high safety due to inert properties thereof and can be easily applied to ships due to no phase change.

A reliquefaction system employing a cooling cycle using nitrogen refrigerant has a nitrogen refrigerant cycle in which the nitrogen refrigerant discharged from a heat exchanger after heat exchange is compressed and cooled through a compander, expanded and cooled again, and returned to the heat exchanger.

It is an aspect of the present invention to provide a power-saving liquefied gas-fueled ship capable of reducing power consumption through effective heat exchange in processing boil-off gas using a nitrogen refrigerant system.

Technical Solution

In accordance with one aspect of the present invention, there is provided a power-saving type liquefied-gas-fuel ship including: a liquefied gas storage tank storing liquefied gas; an engine using the liquefied gas stored in the liquefied gas storage tank or boil-off gas generated by spontaneous vaporization of the liquefied gas as fuel; a fuel feeder supplying the liquefied gas as fuel for the engine; a compressor compressing the boil-off gas to a pressure required for the engine; a heat exchanger cooling the remaining boil-off gas not supplied to the engine among the boil-off gas compressed by the compressor; a refrigerant circulation line in which the refrigerant supplied to the heat exchanger circulates; a refrigerant compressor provided to the refrigerant circulation line and compressing the refrigerant discharged from the heat exchanger after heat exchange in the heat exchanger; and a cold heat recovery device recovering cold heat of the liquefied gas supplied as fuel for the engine to cool the refrigerant compressed by the refrigerant compressor.

The fuel feeder may include: a high-pressure pump pressurizing the liquefied gas to a pressure required for the engine; and a high-pressure vaporizer vaporizing the liquefied gas pressurized by the high-pressure pump, and the cold heat recovery device may be disposed between the high-pressure pump and the high-pressure vaporizer.

The power-saving type liquefied-gas-fuel ship may further include: a refrigerant expander provided to the refrigerant circulation line and cooling the refrigerant to be supplied to the heat exchanger through expansion of the refrigerant; a first valve provided to the refrigerant circulation line and controlling a flow path to allow the refrigerant compressed in the refrigerant compressor to be introduced into the refrigerant expander after being cooled through the heat exchanger; a second valve provided to the refrigerant circulation line to control the flow path to allow the refrigerant compressed in the refrigerant compressor to be introduced into the refrigerant expander after being cooled through the cold heat recovery device.

The power-saving type liquefied-gas-fuel ship may further include: a first temperature detector measuring a temperature of the liquefied gas supplied to the cold heat recovery device; a second temperature detector measuring the temperature of the liquefied gas discharged from the cold heat recovery device; and a controller controlling opening/closing and a degree of opening of the second valve based on temperature measurements of the first and second temperature detectors.

The power-saving type liquefied-gas-fuel ship may further include: a third temperature detector measuring the temperature of the refrigerant supplied to the cold heat recovery device; a fourth temperature detector measuring the temperature of the refrigerant discharged from the cold heat recovery device; and a controller controlling opening/closing and a degree of opening of the second valve based on temperature measurements of the third and fourth temperature detectors.

The heat exchanger may perform heat exchange with respect to four streams including a compressed gas compressed in the compressor, the refrigerant expanded and cooled in the refrigerant expander, uncompressed boil-off gas to be introduced into the compressor from the storage tank, and the refrigerant compressed in the refrigerant compressor.

The power-saving type liquefied-gas-fuel ship may further include: a controller measuring a temperature of the refrigerant supplied to the refrigerant compressor to regulate an overall flow rate of the refrigerant circulating in the refrigerant circulation line.

In accordance with another aspect of the present invention, there is provided a method for processing boil-off gas for liquefied-gas-fuel ship using liquefied gas stored in a liquefied gas storage tank or boil-off gas generated by spontaneous vaporization of the liquefied gas as fuel for an engine, wherein the boil-off gas is compressed and supplied to the engine at a pressure required for the engine, and the remaining boil-off gas not supplied to the engine is reliquefied and returned to the liquefied gas storage tank, and wherein, for reliquefaction of the compressed boil-off gas, the compressed boil-off gas, uncompressed boil-off gas discharged from the liquefied gas storage tank, and a refrigerant circulating in the refrigerant circulation line are subjected to heat exchange in a heat exchanger, the refrigerant heated while cooling the compressed boil-off gas is compressed, and some or all of the compressed refrigerant is cooled through heat exchange with the liquefied gas to be supplied to the engine from the liquefied gas storage tank.

The remaining compressed refrigerant excluding the refrigerant to be heat exchanged with the liquefied gas may be supplied to the heat exchanger to be cooled by the heat exchanger.

A flow rate of the refrigerant to be heat exchanged with the liquefied gas may be controlled depending on a temperature measurement of the liquefied gas to be heat exchanged with the refrigerant and a temperature measurement of the liquefied gas discharged after heat exchange with the refrigerant.

The flow rate of the refrigerant to be heat exchanged with the liquefied gas may be controlled depending on a temperature measurement of the refrigerant to be heat exchanged with the liquefied gas and a temperature measurement of the refrigerant discharged after heat exchange with the liquefied gas.

Advantageous Effects

A power-saving liquefied gas-fueled ship according to the present invention and a boil-off gas processing method of the liquefied gas-fueled ship can increase a reliquefaction rate by effectively cooling boil-off gas to be reliquefied using cold heat of the boil-off gas itself and the refrigerant cycle and can reduce power for compression of a refrigerant in the refrigerant cycle while increasing energy efficiency of the ship by compressing the refrigerant using expansion energy of the refrigerant in the refrigerant cycle.

In addition, the power-saving liquefied gas-fueled ship and the boil-off gas processing method can liquefy boil-off gas by recovering unused cold heat energy of liquefied gas as fuel, thereby increasing reliquefaction efficiency through reduction in flow rate of nitrogen refrigerant for liquefaction of boil-off gas, capacity of devices for compression and expansion of the refrigerant, power consumption, and installation and operation costs.

EMBODIMENTS

Figure 1:
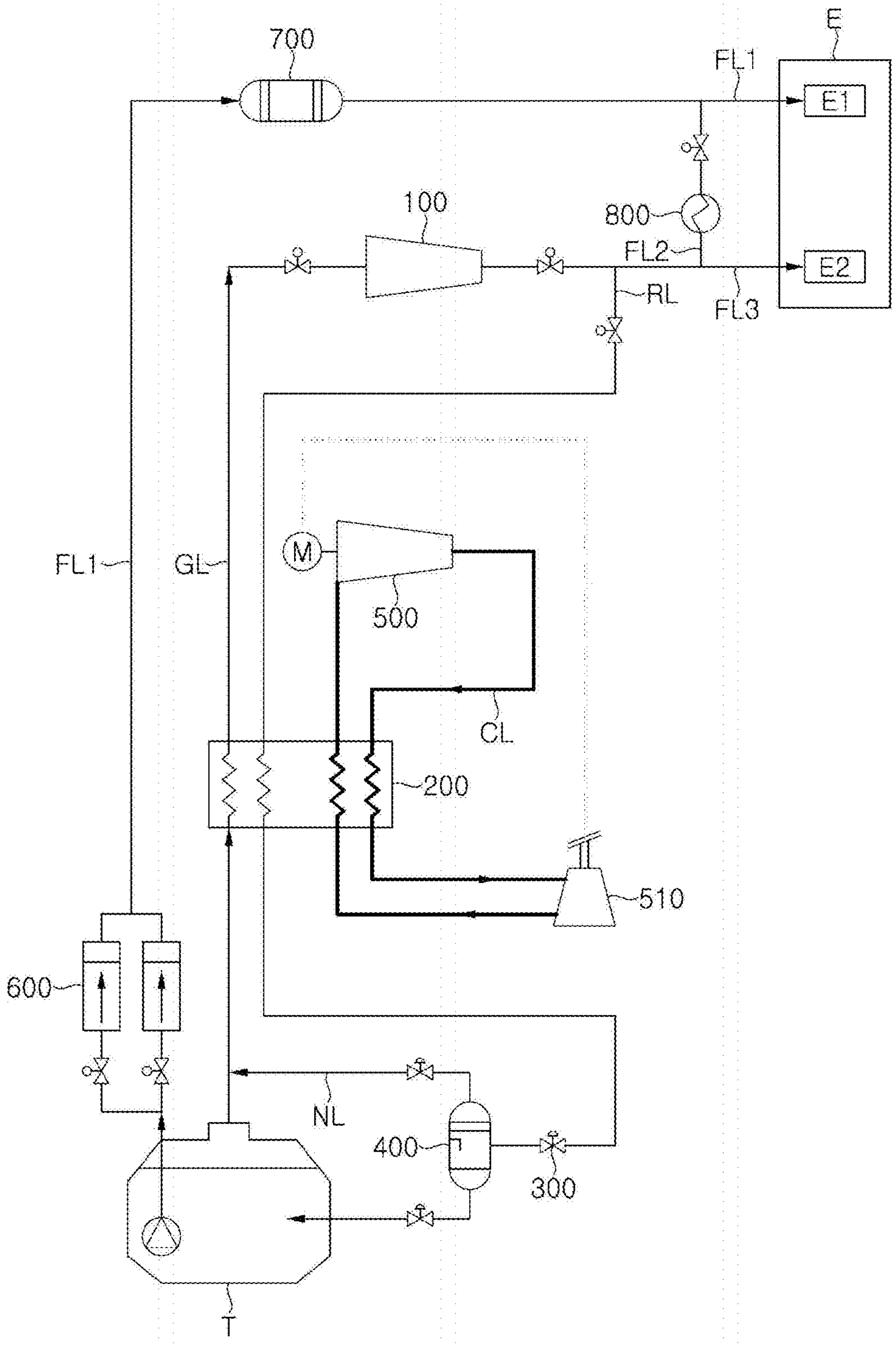
FIG. 1 is a diagram of a boil-off gas processing system of a liquefied gas-fueled ship employing a nitrogen refrigerant cycle.

In order to fully appreciate the operational advantages of the present invention and the objectives achieved by practicing the present invention, reference should be made to the accompanying drawings, which illustrate embodiments of the present invention, and description thereof.

Hereinafter, embodiments of the present invention will be described in detail in terms of the features and effects thereof with reference to the accompanying drawings. It should be noted that like components will be denoted by like reference numerals throughout the specification and the accompanying drawings.

As used herein, the term "ship" may refer to any type of liquefied gas-fueled ship (LFS) that is provided with an engine capable of using liquefied gas and boil-off gas generated from the liquefied gas as fuel for propulsion or power generation engines, or that uses liquefied gas or boil-off gas as fuel for onboard engines. For example, the ship may include self-propelled vessels, such as an LNG carrier, a liquid hydrogen carrier, and an LNG regasification vessel (RV), as well as non-self-propelled floating offshore structures, such as an LNG floating production storage offloading (FPSO) unit and an LNG floating storage regasification unit (FSRU).

In addition, the term "liquefied gas" as used herein may include any type of liquefied gas that the gas can be liquefied to low temperature to be transported, can produce boil-off gas in a stored state, and can be used as fuel for engines or the like. For example, such liquefied gas may include liquefied petrochemical gas, such as liquefied natural gas (LNG), liquefied ethane gas (LEG), liquefied petroleum gas (LPG), liquefied ethylene gas, liquefied propylene gas, and the like. In the following embodiments, by way of example, the present invention will be described as using LPG which is a typical liquefied gas.

Fluid flowing through each line of embodiments of the present invention may be in any one of a liquid state, a gas-liquid mixture state, a gaseous state, or a supercritical fluid state depending on operating conditions of a system.

Furthermore, in one embodiment of the invention described below, an engine may be a gas-fueled engine capable of using natural gas as dual fuel among engines used in the ship, and may include at least one of a high-pressure gas injection engine, a medium-pressure gas injection engine, and a low-pressure gas injection engine.

By way of example, the high-pressure gas injection engine may be an engine using a gaseous fuel at about 100 bar to about 400 bar, or at about 150 bar or more, preferably at about 300 bar, for example, an ME-GI engine. Further, the medium pressure gas injection engine may be an engine using a gaseous fuel at about 10 bar to about 20 bar, preferably about 16 bar, for example, an X-DF engine, and the low pressure gas injection engine may be an engine using a gas fuel at about 5 bar to about 10 bar, preferably at about 6.5 bar, such as a DF engine, a DFDG engine, a DFGE engine, and the like.

In the following embodiments of the invention, an ME-GI engine is applied as a main engine for propulsion and a DFDE engine is applied as a secondary engine for power generation.

First, referring to FIG. 1, a liquefied gas-fueled ship includes a storage tank T storing liquefied gas, a compressor 100 compressing boil-off gas generated by spontaneous vaporization of the liquefied gas fuel in the storage tank T, and a heat exchanger 200 cooling all or some of the boil-off gas compressed in the compressor 100 through heat exchange with uncompressed boil-off gas and a refrigerant to be introduced into the compressor 100 from the storage tank T.

In addition, the liquefied gas-fueled ship is provided with a boil-off gas supply line GL extending from the storage tank T to the compressor 100 and a reliquefaction line RL extending from a rear end of the compressor 100 to the heat exchanger 200 and from the heat exchanger 200 to the storage tank T.

In addition, the liquefied gas-fueled ship is further provided with a refrigerant circulation line CL in which the refrigerant supplied to the heat exchanger 200 circulates. Here, the refrigerant circulation line CL is provided with a refrigerant expander 510 cooling the refrigerant supplied to the heat exchanger 200 through expansion of the refrigerant and a refrigerant compressor 500 compressing the refrigerant discharged from the heat exchanger 200 after heat exchange in the heat exchanger 200.

The refrigerant compressor 500 may be a compander and may be axially coupled to the refrigerant expander 510 to drive the compander with expansion energy of the refrigerant received from the refrigerant expander 510. Alternatively, the refrigerant compressor 500 may be driven by a motor and may connect the motor to the refrigerant expander 510 such that the motor can be driven by expansion energy of the refrigerant received from the refrigerant expander 510 to compress the refrigerant.

The refrigerant compressed in the refrigerant compressor 500 is introduced into the heat exchanger 200 to be cooled in the heat exchanger 200, is supplied along the refrigerant circulation line CL to the refrigerant expander 510, in which the refrigerant is expanded and cooled, and is again supplied to the heat exchanger 200.

According to this embodiment, in the heat exchanger 200, four streams including all or some of compressed boil-off gas, uncompressed boil-off gas to be introduced into the compressor 100, the refrigerant expanded and cooled in the refrigerant expander 510, and the refrigerant compressed in the refrigerant compressor 500 are subjected to heat exchange.

That is, a refrigerant cycle, in which the refrigerant is compressed, cooled by cold heat of the refrigerant itself, expanded and supplied to the heat exchanger 100 for circulation, is combined with the PRS system of the applicant of the present invention, in which compressed boil-off gas is cooled by uncompressed boil-off gas to be introduced into the compressor 100, such that the four streams are subjected to heat exchange in the heat exchanger.

The refrigerant supplied to the heat exchanger 200 while circulating in the refrigerant circulation line CL may be, for example, nitrogen ($N_2$).

When boil-off gas is cooled by heat exchange through the refrigerant cycle in which the compressed refrigerant is supplied to the heat exchanger 200, cooled by cold heat of the refrigerant itself, and then expanded and supplied to the heat exchanger 200 for circulation, a large amount of nitrogen refrigerant is required to cool the boil-off gas to a liquefaction temperature due to a difference in heat capacity between nitrogen and the boil-off gas mainly composed of methane, whereby cooling the nitrogen refrigerant itself requires use of most of cold heat of the refrigerant cycle and increases capacity of devices for compression and expansion of the refrigerant, thereby causing increase in power consumption.

To address these problems, the liquefied gas-fueled ship according to this embodiment reduces the flow rate of the refrigerant required for the refrigerant cycle by allowing cryogenic uncompressed boil-off gas generated in the storage tank T to be also introduced into the compressor 100 through the heat exchanger 200.

As a result, the liquefied gas-fueled ship according to this embodiment can reduce installation and operating costs through reduction in capacity of the devices for compression and expansion of the refrigerant and power consumption.

The structure in which the four streams are subjected to heat exchange in the heat exchanger can reduce power consumption by about 25%, as compared to the refrigerant cycle in which the refrigerant is cooled with cold heat of the refrigerant.

To process boil-off gas, the liquefied gas-fueled ship may further include a decompressor 300 that decompresses compressed boil-off gas cooled in the heat exchanger 200, and a gas-liquid separator 400 that vaporizes the boil-off gas decompressed in the decompressor 300 and sends only reliquefied boil-off gas in a liquid phase to the storage tank T.

Here, the decompressor 300 may include an expander or an expansion valve, such as a Joule-Thomson valve, which decompresses the compressed and cooled boil-off gas. Through decompression, the boil-off gas is cooled by adiabatic or isentropic expansion.

In addition, the boil-off gas further cooled in the decompressor 300 through decompression is introduced into the gas-liquid separator 400 and the liquid separated in the gas-liquid separator 400 is supplied to the storage tank T along the reliquefaction line RL for re-storage.

However, since the gas-liquid separator 400 fails to achieve 100% phase separation of flash gas, which is a gas, and liquefied gas, which is a liquid, the separated liquid or liquefied gas may contain unseparated flash gas.

The flash gas separated in the gas-liquid separator 400 may be introduced as a refrigerant into the heat exchanger 200 by joining with an uncompressed boil-off gas stream at the front of the heat exchanger 200 through an uncompressed gas line NL extending from an upper end of the gas-liquid separator 400 to the boil-off gas supply line GL at the front of the heat exchanger 200.

On the other hand, when a ship is the liquefied gas-fueled ship, liquefied gas stored in the storage tank T may be used as fuel for an engine E upon a ship speed. Here, the storage tank T may be a fuel tank that stores the liquefied gas as fuel.

As means for supplying liquefied gas fuel stored in the storage tank T to the engine E, the liquefied gas-fueled ship is provided with a low pressure pump (not shown) discharging the liquefied gas fuel stored from the storage tank T, a high-pressure pump 600 pressurizing the liquefied gas fuel discharged from the storage tank T by the low-pressure pump such that the liquefied gas fuel can be supplied to the engine E at a pressure required for the engine E, and a high-pressure vaporizer 700 vaporizing the liquefied gas fuel compressed by the high-pressure pump 600 to a state required for the engine E.

Here, the engine E includes a first engine E1 that is a propulsion engine used to propel the ship, and a second engine E2 that is a generator used to generate electricity to be supplied to a power demand site in the ship. In this embodiment, by way of example, an ME-GI engine will be described as the propulsion engine E1.

Further, in this embodiment, the high-pressure pump 600 may compress the liquefied gas transferred from the storage tank T such that the liquefied gas to be supplied to the engine E meets a pressure condition required for the first engine E.

The gaseous fuel vaporized by the high-pressure vaporizer 700 may be supplied to the first engine E1 through a first fuel supply line FL1 and may also be supplied to the second engine E2 through a second fuel supply line FL2 that branches from the first fuel supply line FL1 between the high-pressure vaporizer 700 and the first engine E1 and is connected to the second engine E2.

The second fuel supply line FL2 is provided with a fuel heater 800 that regulates the temperature of the gaseous fuel supplied to the second engine E2 to a temperature condition required for the second engine E2.

In addition, some or all of the boil-off gas compressed in the compressor 100 may also be supplied as fuel for the engine E through a third fuel supply line FL3 connecting the compressor 100 to the engine E.

In this embodiment, the third fuel supply line FL3 is connected to the second engine E2 downstream of the compressor 100 such that the compressed boil-off gas in the compressor 100 is supplied as fuel for the second engine E2.

That is, in this embodiment, the compressor 100 may compress the boil-off gas to a pressure required for the second engine E2.

However, it should be understood that the present invention is not limited thereto. Alternatively, the compressor 100 may compress the boil-off gas to, for example, a fuel supply pressure of a main engine of the ship. The boil-off gas may be compressed to 5.5 barg for a DF engine, 15 barg for an X-DF engine, or 300 barg for an ME-GI engine. The compressed boil-off gas may be used as fuel for the main engine (not shown) of the ship and the boil-off gas not used as fuel may be reliquefied.

Shipboard regulations require that compressors for supplying fuel to an engine be designed with redundancy in case of an emergency, meaning that if one compressor is unavailable for failure, maintenance or other reasons, the other compressor can be used instead of the one compressor. Although a single compressor is shown in the drawings, the compressor may be composed of a primary compressor and a redundant compressor.

Among the boil-off gas compressed in the compressor 100, the remaining compressed boil-off gas not supplied as fuel for the engine E is introduced into the heat exchanger 200 through the reliquefaction line RL.

Among the boil-off gas compressed in the compressor 100, the compressed boil-off gas introduced into the reliquefaction line RL is cooled in the heat exchanger 200. The compressed boil-off gas to be reliquefied and the refrigerant compressed in the refrigerant compressor become a hot stream in the heat exchanger, and the uncompressed boil-off gas and the refrigerant expanded and cooled in the refrigerant expander become a cold stream. In the heat exchanger 200, the four streams are heat exchanged and the hot stream is cooled through heat exchange with the cold stream.

In the liquefied gas-fueled ship equipped with a high pressure engine as a propulsion engine, such as an ME-GI engine, for the purpose of cost reduction, the high-pressure pump 600 is used to supply liquefied gas after compressing the liquefied gas to a high pressure required for the ME-GI engine, instead of a high-pressure compressor as a means for supplying the liquefied gas fuel This is because installation and operation of the high-pressure pump for compressing liquefied gas in a liquid state to high pressure to vaporize a liquid at high pressure after compressing the liquefied gas to high pressure is more economical than installation and operation of the high-pressure compressor for compressing the liquefied gas in a gaseous state to high pressure after vaporizing the liquefied gas.

However, this method has a problem in that, when the liquefied gas fuel is supplied from the storage tank T to the first engine E1 due to ship speed, cold heat of the liquefied gas transferred from the storage tank T to the high-pressure vaporizer 700 through the first fuel supply line FL1 is not recovered at all and is discarded.

On the other hand, the nitrogen refrigerant in a gaseous state, which is used as a refrigerant for liquefaction of the boil-off gas in the heat exchanger 200, is increased in temperature while being compressed in the refrigerant compressor 500 by a compression process. According to the method shown in FIG. 1, the compressed nitrogen refrigerant undergoes a cooling process in the heat exchanger 200 before an expansion process in which the temperature of the nitrogen refrigerant is reduced by expansion in the refrigerant expander 510.

The liquefied gas-fueled ship according to this embodiment is obtained through improvement of the boil-off gas processing system shown in FIG. 1 to reduce power consumption.

Figure 2:
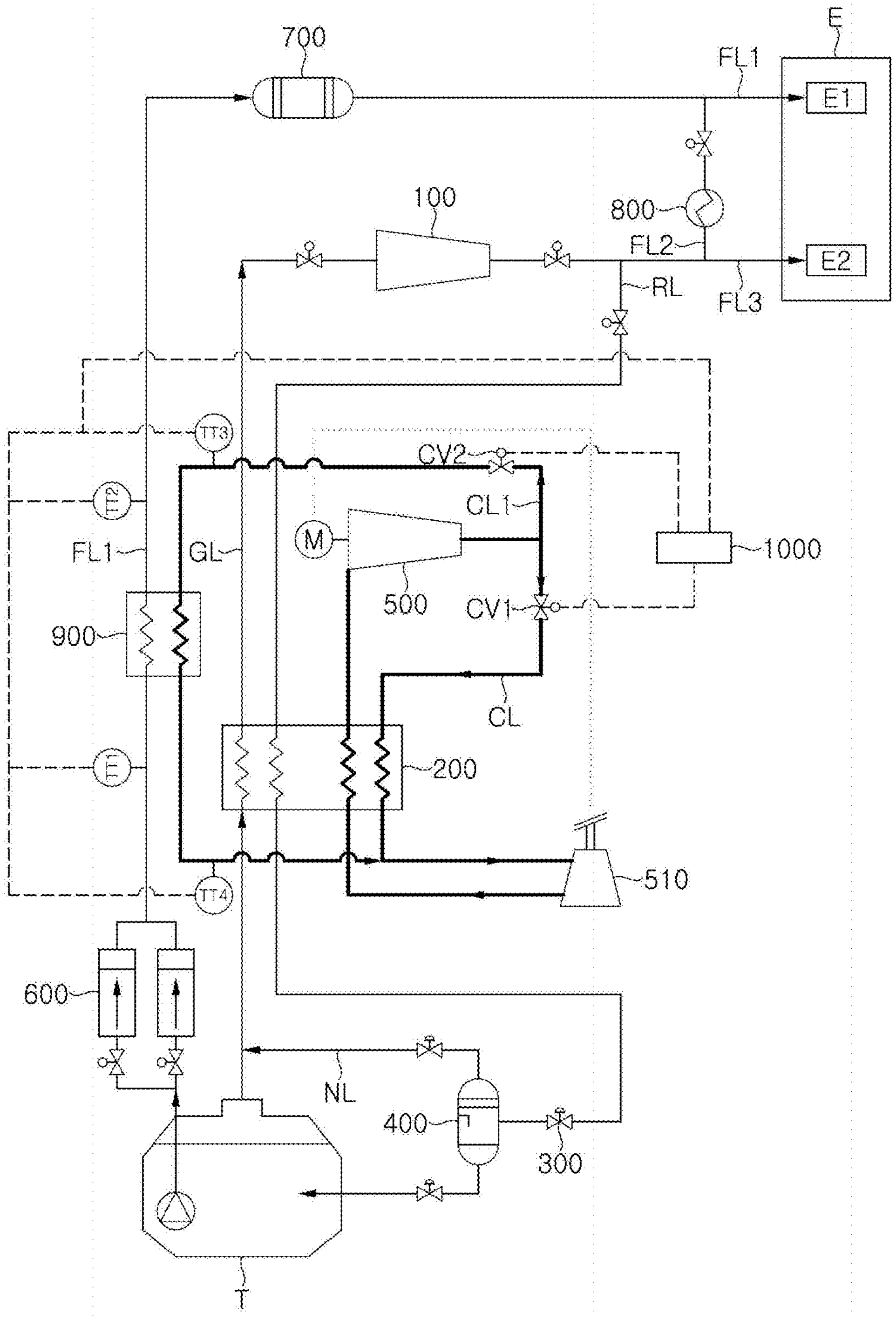
FIG. 2 is a diagram of a boil-off gas processing system for a power-saving liquefied gas-fueled ship according to one embodiment of the present invention.

Referring to FIG. 2, in the liquefied gas-fueled ship according to this embodiment, the first fuel supply line FL1 between the high-pressure pump 600 and the high-pressure vaporizer 700 is further provided with a cold heat recovery device 900 recovering cold heat of the compressed liquefied gas transferred from the high-pressure pump 600 to the high-pressure vaporizer 700, and a refrigerant cooling line CL1 branching from the refrigerant circulation line CL, which extends from a downstream side of the refrigerant compressor 500 to the heat exchanger 200, to allow some or all of the nitrogen refrigerant compressed in the refrigerant compressor 500 to be supplied to the cold heat recovery device 900.

In the cold heat recovery device 900, liquefied gas in a liquid or supercritical phase at high pressure compressed by the high-pressure pump 600 while flowing along the first fuel supply line FL1 is subjected to heat exchange with the nitrogen refrigerant in a gaseous state compressed by the refrigerant compressor 500 while flowing along the refrigerant cooling line CL1, whereby the liquefied gas is heated and the nitrogen refrigerant is cooled.

The liquefied gas heated by heat exchange in the cold heat recovery device 900 is supplied to the high-pressure vaporizer 700 and the nitrogen refrigerant cooled by heat exchange in the cold heat recovery device 900 is supplied to the refrigerant expander 510.

As such, the liquefied gas-fueled ship includes the cold heat recovery device 900 such that all or some of the nitrogen refrigerant can be sent to the cold heat recovery device 900 to recover cold heat of the liquefied gas fuel downstream of the high-pressure pump 600 before being supplied as a refrigerant for liquefying the compressed boil-off gas in the heat exchanger 200, whereby the flow rate of the nitrogen refrigerant required to liquefy the boil-off gas can be reduced, as compared to the case where a process of recovering cold heat of the liquefied gas fuel is absent, thereby reducing power consumption of the refrigerant compressor 500.

In addition, the liquefied gas-fueled ship may further include a refrigerant flow regulation means that controls a flow rate of the nitrogen refrigerant to be supplied to the refrigerant expander 510 after cooling in the cold heat recovery device 900, that is, a flow rate of the nitrogen refrigerant to be branched to the refrigerant cooling line CL1, and a flow rate of the nitrogen refrigerant to be supplied to the refrigerant expander 510 after cooling in the heat exchanger 200, that is, a flow rate of the nitrogen refrigerant to be branched to the refrigerant circulation line CL, among the compressed nitrogen refrigerant in the refrigerant compressor 500.

As the refrigerant flow regulation means, the liquefied gas-fueled ship includes a first valve CV1 disposed downstream of a branch point of the refrigerant cooling line CL1 and provided to the refrigerant circulation line CL between the refrigerant compressor 500 and the heat exchanger 200, a second valve CV2 provided to the refrigerant cooling line CL1 between the refrigerant compressor 500 and the heat recovery device 900, and a controller 1000 controlling opening/closing and the degrees of opening of the first valve CV1 and the second valve CV2.

In addition, the liquefied gas-fueled ship further includes: a first temperature detector TT1 provided to the first fuel supply line FL1 between the high-pressure pump 600 and the cold-heat recovery device 900 to measure the temperature of cold compressed liquefied gas supplied to the cold-heat recovery device 900; a second temperature detector TT2 provided to the first fuel supply line FL1 between the cold heat recovery device 900 and the high-pressure vaporizer 700 to measure the temperature of hot compressed liquefied gas flowing to the high-pressure vaporizer 700 after cold heat is recovered in the cold heat recovery device 900; a third temperature detector TT3 provided to the refrigerant cooling line CL1 between the refrigerant compressor 500 and the cold heat recovery device 900 to measure the temperature of hot nitrogen refrigerant supplied to the cold heat recovery device 900; and a fourth temperature detector TT4 disposed between the cold heat recovery device 900 and the refrigerant expander 510 to measure the temperature of cold nitrogen refrigerant flowing to the refrigerant expander 510 after being cooled in the cold heat recovery device 900.

Temperature measurements measured by the first temperature detector TT1, the second temperature detector TT2, the third temperature detector TT3, and the fourth temperature detector TT4 are transmitted to the controller 1000 and the controller 1000 receives the temperature measurements and transmits output values corresponding to the temperature measurements, that is, valves indicative of opening/closing and the degree of opening, to the first valve V1 and the second valve CV2 to control the first valve CV1 and the second valve CV2.

That is, depending upon the temperature measurements of the liquefied gas fuel upstream and downstream of the cold heat recovery device 900 and/or the temperature measurements of the refrigerant upstream and downstream of the cold heat recovery device 900, the refrigerant compressor 500 controls the flow rate of the nitrogen refrigerant to be branched to the cold heat recovery device 900 among the nitrogen refrigerant compressed in the refrigerant compressor 500.

On the other hand, the flow rate of the nitrogen refrigerant circulating in the refrigerant circulation line CL to liquefy the boil-off gas in the heat exchanger 200 may be regulated by measuring the temperature of the nitrogen refrigerant upstream of the refrigerant compressor 500 and regulating the flow rate of the nitrogen refrigerant depending on the temperature of the nitrogen refrigerant.

This can be derived using the temperature measurements of the second temperature detector TT2, the third temperature detector TT3, and the fourth temperature detector TT4.

As such, load (power) of the refrigerant expander 510 is reduced by gradually opening the second valve CV2 to increase the flow rate of the refrigerant introduced into the cold heat recovery device 900 while gradually decreasing the total flow rate of the refrigerant circulating in the refrigerant cycle, that is, in the refrigerant circulation line CL.

For example, some of the refrigerant circulating in the refrigerant cycle is temporarily stored in a separate refrigerant tank (not shown) based on the temperature measurement upstream of the decompressor 300.

When LNG fuel supply decreases, that is, the flow rate of LNG introduced into the cold heat recovery device 900 decreases, the temperature measurement of the fourth temperature detector TT4 increases. In this case, the second valve CV2 is controlled to close gradually and the first valve CV1 is controlled to open gradually.

Conversely, when the LNG fuel supply increases, that is, the flow rate of LNG introduced into the cold heat recovery device 900 increases, the temperature measurement of the second temperature detector TT2 decreases. In this case, the second valve CV2 is controlled to open gradually and the first valve CV1 is controlled to close gradually.

Similarly, the temperature measurements of the first temperature detector TT1, the second temperature detector TT2, the third temperature detector TT3, and the fourth temperature detector TT4 may be used to verify heat exchange performance of the cold heat recovery device 900 and to perform double checking such that all of cold heat can be recovered.

Although some embodiments have been described herein, the present invention is not limited to the above embodiments and may be practiced in various modifications or variations without departing from the technical spirit of the invention, as will become apparent to one of ordinary skill in the art to which the present invention pertains.

The invention claimed is:

1. A power-saving liquefied-gas-fuel ship comprising:
- a liquefied gas storage tank configured to store liquefied gas;
- an engine configured to use the liquefied gas stored in the liquefied gas storage tank or boil-off gas generated by spontaneous vaporization of the liquefied gas as fuel;
- a fuel feeder configured to supply the liquefied gas as fuel for the engine;
- a compressor configured to compress the boil-off gas to a pressure required for the engine;
- a heat exchanger configured to cool the remaining boil-off gas not supplied to the engine among the boil-off gas compressed by the compressor;
- a refrigerant compressor provided to a refrigerant circulation line and configured to compress refrigerant discharged from the heat exchanger after heat exchange in the heat exchanger;
- the refrigerant circulation line configured to supply the refrigerant to the heat exchanger to cool the refrigerant compressed by the refrigerant compressor by heat exchange with uncompressed boil-off gas introduced from the liquefied gas storage tank to the compressor;
- a cold heat recovery device configured to recover cold heat of the liquefied gas supplied as fuel for the engine to cool the refrigerant compressed by the refrigerant compressor;
- a refrigerant cooling line branched from the refrigerant circulation line connected from the refrigerant compressor to the heat exchanger, configured such that part or all of the refrigerant compressed by the refrigerant compressor is supplied to the cold heat recovery device and cooled by heat exchange with the liquefied gas; and
- a flow rate regulator configured to control a flow rate branched to the refrigerant cooling line and a flow rate branched to the refrigerant circulation line among the refrigerant compressed by the refrigerant compressor.

2. The power-saving liquefied-gas-fuel ship according to claim 1,
- wherein the fuel feeder comprises a high-pressure pump configured to pressurize the liquefied gas to a pressure required for the engine and a high-pressure vaporizer configured to vaporize the liquefied gas pressurized by the high-pressure pump, and
- wherein the cold heat recovery device is disposed between the high-pressure pump and the high-pressure vaporizer.

3. The power-saving liquefied-gas-fuel ship according to claim 1, further comprising:
- a refrigerant expander provided to the refrigerant circulation line and configured to cool the refrigerant to be supplied to the heat exchanger through expansion of the refrigerant;
- wherein the flow rate regulator comprises:
  - a first valve provided to the refrigerant circulation line and configured to control a first flow of the refrigerant compressed in the refrigerant compressor to be introduced into the heat exchanger; and
  - a second valve provided to the refrigerant cooling line and configured to control a second flow of the refrigerant compressed in the refrigerant compressor to be introduced into the cold heat recovery device.

4. The power-saving liquefied-gas-fuel ship according to claim 3, further comprising:
- a first temperature detector configured to measure a temperature of the liquefied gas supplied to the cold heat recovery device;
- a second temperature detector configured to measure a temperature of the liquefied gas discharged from the cold heat recovery device; and a controller configured to control opening/closing and a degree of opening of the second valve based on temperature measurements of the first temperature detector and the second temperature detector.

5. The power-saving type-liquefied-gas-fuel ship according to claim 3, wherein the heat exchanger is configured to perform heat exchange with respect to four streams comprising the compressed boil-off gas compressed in the compressor, the refrigerant expanded and cooled in the refrigerant expander, the uncompressed boil-off gas to be introduced into the compressor from the storage tank, and the refrigerant compressed in the refrigerant compressor.

6. The power-saving liquefied-gas-fuel ship according to claim 3, wherein the flow rate regulator comprises:

a controller configured to measure a temperature of the refrigerant supplied to the refrigerant compressor to regulate an overall flow rate of the refrigerant circulating in the refrigerant circulation line.

7. The power-saving liquefied-gas-fuel ship according to claim 3, further comprising:

a third temperature detector configured to measure a temperature of the refrigerant supplied to the cold heat recovery device;

a fourth temperature detector configured to measure a temperature of the refrigerant discharged from the cold heat recovery device; and a controller configured to control opening/closing and a degree of opening of the second valve based on temperature measurements of the third temperature detector and the fourth temperature detector.

8. The power-saving liquefied-gas-fuel ship according to claim 4, wherein the flow rate regulator further comprising:

a third temperature detector configured to measure a temperature of the refrigerant supplied to the cold heat recovery device; and a fourth temperature detector configured to measure a temperature of the refrigerant discharged from the cold heat recovery device, wherein the controller is configured to control opening/closing and the degree of opening of the second valve based on temperature measurements of the third temperature detector and the fourth temperature detector.

* * * * *